United States Patent
Srinivasan et al.

(10) Patent No.: US 11,899,634 B2
(45) Date of Patent: Feb. 13, 2024

(54) PERFORMANCE-CENTRIC CLOUD DATABASE VIRTUAL CORE SIZING STACK

(71) Applicant: Accenture Global Solutions Limited, Dublin (IE)

(72) Inventors: Madhan Kumar Srinivasan, Bengaluru (IN); Guruprasad Pv, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 503 days.

(21) Appl. No.: 17/204,102

(22) Filed: Mar. 17, 2021

(65) Prior Publication Data

US 2022/0300471 A1    Sep. 22, 2022

(51) Int. Cl.
*G06F 16/21* (2019.01)
*G06F 9/50* (2006.01)
*G06N 20/00* (2019.01)

(52) U.S. Cl.
CPC ............ *G06F 16/217* (2019.01); *G06F 9/505* (2013.01); *G06F 9/5016* (2013.01); *G06N 20/00* (2019.01)

(58) Field of Classification Search
CPC ....... G06F 16/217; G06F 9/5016; G06F 9/505
See application file for complete search history.

(56) References Cited

U.S. PATENT DOCUMENTS

| | | | |
|---|---|---|---|
| 2017/0286516 A1* | 10/2017 | Horowitz | G06F 16/2365 |
| 2019/0171569 A1* | 6/2019 | Battle | G06F 9/524 |
| 2021/0096914 A1* | 4/2021 | Troester | G06F 9/5061 |
| 2022/0179696 A1* | 6/2022 | Dawkins | G06F 11/3466 |

FOREIGN PATENT DOCUMENTS

CN    100401232 C   *   7/2008   ......... G06F 1/3203

OTHER PUBLICATIONS

David Davis, et al., "vCPU Sizing Considerations, Accurately Determine how many vCPUs to Allocate to Virtual Machines," Whitepaper-vCPUSizingConsideration-US-SW-02-27-2013; downloaded from the Internet at: https://virtualizationreview.com/~/media/ECG/Tech%20Library%202013/04/DELL%20VKERNEL%20APRIL/Dell%20%20%20vCPU%20Sizing%20Considerations_0.ashx.

David Davis, et al., "VM Memory (vRAM) Sizing Considerations, Challenges and considerations in determining how much memory to allocate to virtual machines," Whitepaper. 2012 Quest Software, Inc.

* cited by examiner

*Primary Examiner* — Lewis A Bullock, Jr.
*Assistant Examiner* — Kevin X Lu
(74) *Attorney, Agent, or Firm* — Crowell & Moring LLP

(57) ABSTRACT

A multi-layer database sizing stack may generate prescriptive tier requisition tokens for controlling requisition of database-compute resources at database-compute tiers. The input layer of the database sizing stack may obtain historical data. The threading layer may be used to flag occurrences of single threading application execution. The change layer may be used to determine potential for a step based on compute utilization type data and assert flags indicating the potential. The step layer may determine if potential steps may be taken based on operation-rate type data and flush type data. The requisition layer may generate a tier requisition token based on the provisional requisition tokens generated at other layers and/or finalization directives obtained at the requisition layer.

18 Claims, 5 Drawing Sheets

PERFORMANCE-CENTRIC CLOUD DATABASE VIRTUAL CORE SIZING STACK

TECHNICAL FIELD

This disclosure relates to database sizing via a prescriptive analytics based database sizing stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
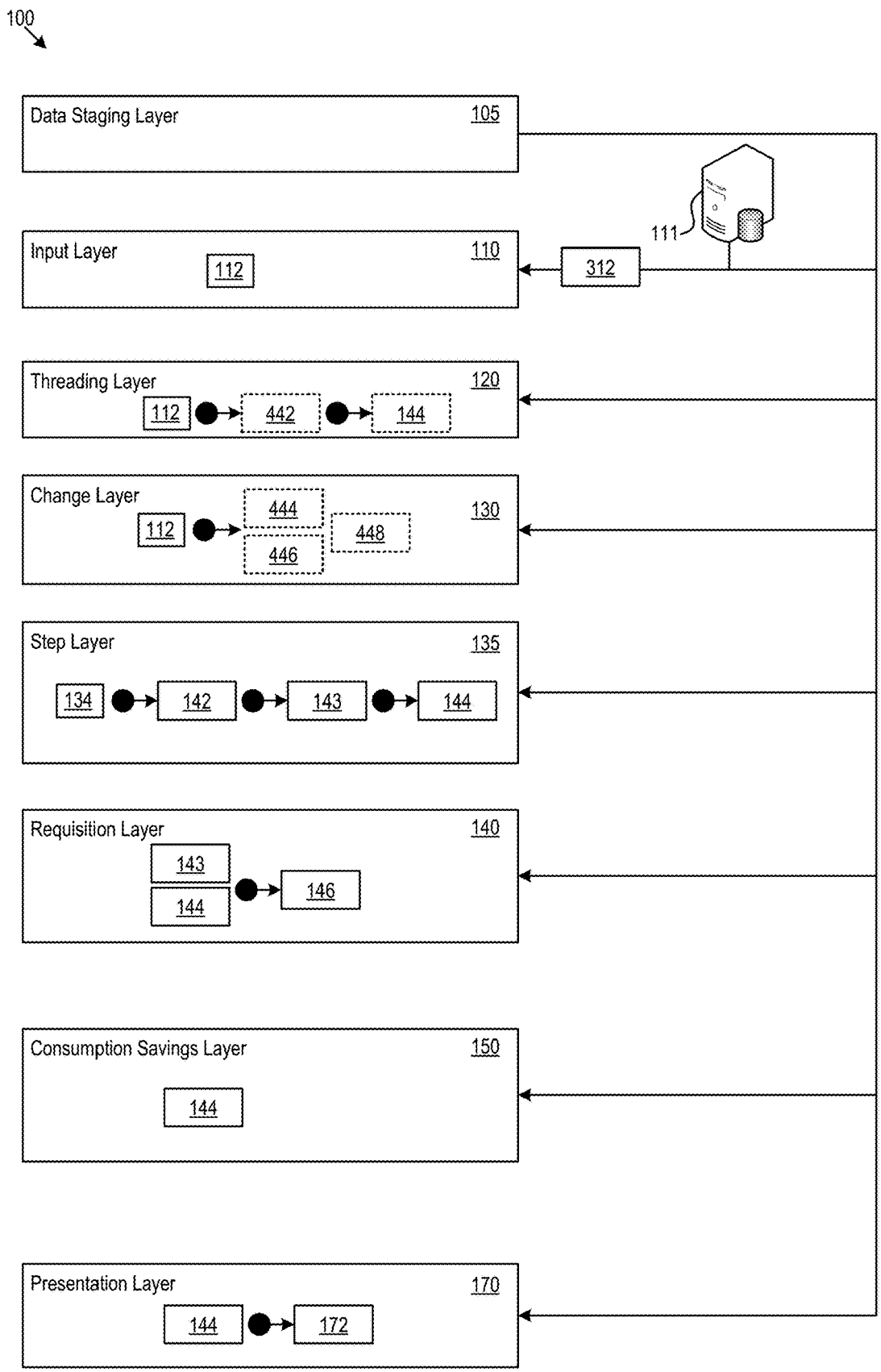
FIG. 1 shows an example multiple-layer database sizing stack.

In cloud computing systems, database-compute resources (e.g., database processor resources, data transaction resources, database connection resources, data transfer throughput resources, or other database-compute resources) may be requisitioned e.g., from database-compute providers such as Azure (e.g., through the Azure vCore system) or other database systems. Various different implementations may provide tiered database-compute offerings where the various tiers provide database-compute resources offering different compute resource levels, such as set storage volumes, random access memory allocations, numbers of processor cores, or other compute resources.

For example, tiers may include the various ones of the vCore numbers within the Azure service offerings. For example, the levels within each of the General Purpose, Business Critical, and Hyperscale service offerings separately for each offering class. In other words, steps may stay within a selected offering rather than switching among offering types. With the General Purpose, Business Critical, and Hyperscale offerings, in some cases the offerings may be split into two separate tiered groups one each for Gen4 and Gen5 processor types.

Although, for example, a given tier may accommodate compute resources for one type of activity. For example, a requisitioned database-compute tier may appropriately support one or more activity level types for a given system. However, other activity types may not necessarily be adequately supported. For example, a given database-compute tier may offer compute resources that reflect processor utilization activity levels, but inadequately address activity levels as indicated by log flush data and/or operation-rate (e.g., database connection/session/transaction operate-rates). In another example, a flush data alone might indicate an activity level that is unduly high given comparatively low processor activity for the example system.

Thus, consideration of multiple indications of compute resource requirements may reduce the risk of underprovision or overprovision. Further, resources dedicated to the over-provisioning of the requisitioned database-compute tier (that does not improve computing performance) could instead be applied to other computing resources that may improve computing performance of the system (as a whole) including, in some cases, non-database compute computing resources. Conversely, an underprovisioned database-compute tier may be operated continually at (or over) capacity and may be unable to fulfill database-compute operations without latency, connection/session backlog accumulation, or other degraded performance. Accordingly, an overprovisioned or underprovisioned database-compute tier may lead to performance degradation or inefficient deployment of hardware resources.

In addition, in various cases, the behavior of single threaded versus multi-threaded applications may differ when executed on multiple-core systems. In some cases, single threaded applications may lead to utilization patterns that indicate high multi-core utilization. However, in some cases, the utilization may be indicative of cores (e.g., processor cores, graphical processing unit cores, or other computational cores) indicating a busy state while idling waiting for data input. In some cases, increasing the available number of cores may increase the number of core entering this idle (but reportedly busy) state simultaneously. Contrary to conventional wisdom, correction to this state is not to respond to high core utilization by requisitioning more cores, but rather to identify the occurrence of single threaded application execution through anomalous utilization characteristics. For example, as discussed below, single threaded application execution may be identified by incidences of simultaneous above-threshold utilization by multiple cores. In other words, if there are more than a predetermined number (e.g., over a given time period) incidences in which utilization for two or more cores rises above a predetermined threshold, then single threaded application execution may be occurring.

Accordingly, increased database-compute tier requisition accuracy provides a technical solution to the technical problem of system inefficiency by increasing the utilization and efficiency of cloud-based database-compute system. The database sizing stack techniques and architectures described below may be used to prescribe database-compute tier requisitioning. A database sizing stack may provide prescriptive analytical database-compute tier correction taking into account allowed operation-rates, processor utilization patterns and random access memory (RAM) utilization, flush data, or other data. Further, the database sizing stack may identify single threaded application execution. Thus, the disclosed database sizing stack techniques computing efficiency/accuracy and provide an improvement over existing solutions. Further, the database sizing stack techniques and architectures provide a practical solution to the technical problem of efficient database operation.

The database sizing stack architectures and techniques may analyze historical data which may include allowed operation-rates, processor utilization and RAM utilization patterns (or other compute utilization), flush data, and/or other data; some implementations, the database sizing stack architectures and techniques may analyze expenditure report data (e.g., consumption metric data) for database-compute resource use: processor activity, memory usage history, storage volume input/output operation history. Furthermore, layers (such as predictive engine layers) may use computing cycles, data throughput, or other utilization metrics, seasonal usage cycles e.g., holiday schedules, daily usage cycles, weekly usage cycles, quarterly usage cycles or other data to forecast future usage. Additionally or alternatively, consumption metric data may include computing resource specific cost metrics such as expenditure-per-time or resource-per-time metrics.

FIG. 1 shows an example multiple-layer database sizing stack 100, which may execute on database sizing circuitry making up the hardware underpinning of the database sizing stack 100. In this example, the database sizing stack 100 includes a data-staging layer 105, an input layer 110, a threading layer 120, a change layer 130, a step layer 135, a requisition layer 140, a consumption savings layer 150, and a presentation layer 170. The database sizing stack 100 may include a multiple-layer computing structure of hardware and/or software that may provide prescriptive analytical recommendations (e.g., prescriptive allowed operation-rates) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the database sizing stack 100, the data-staging layer 105 may provide the change layer 130 with data access resources to access historical data data-types stored in memory. Hence, the data-staging layer 105 may provide a hardware resource, e.g., memory access resources, to the change layer 130. Accordingly, the multiple-layer stack architecture of the database sizing stack may improve the functioning of the underlying hardware.

Figure 2:
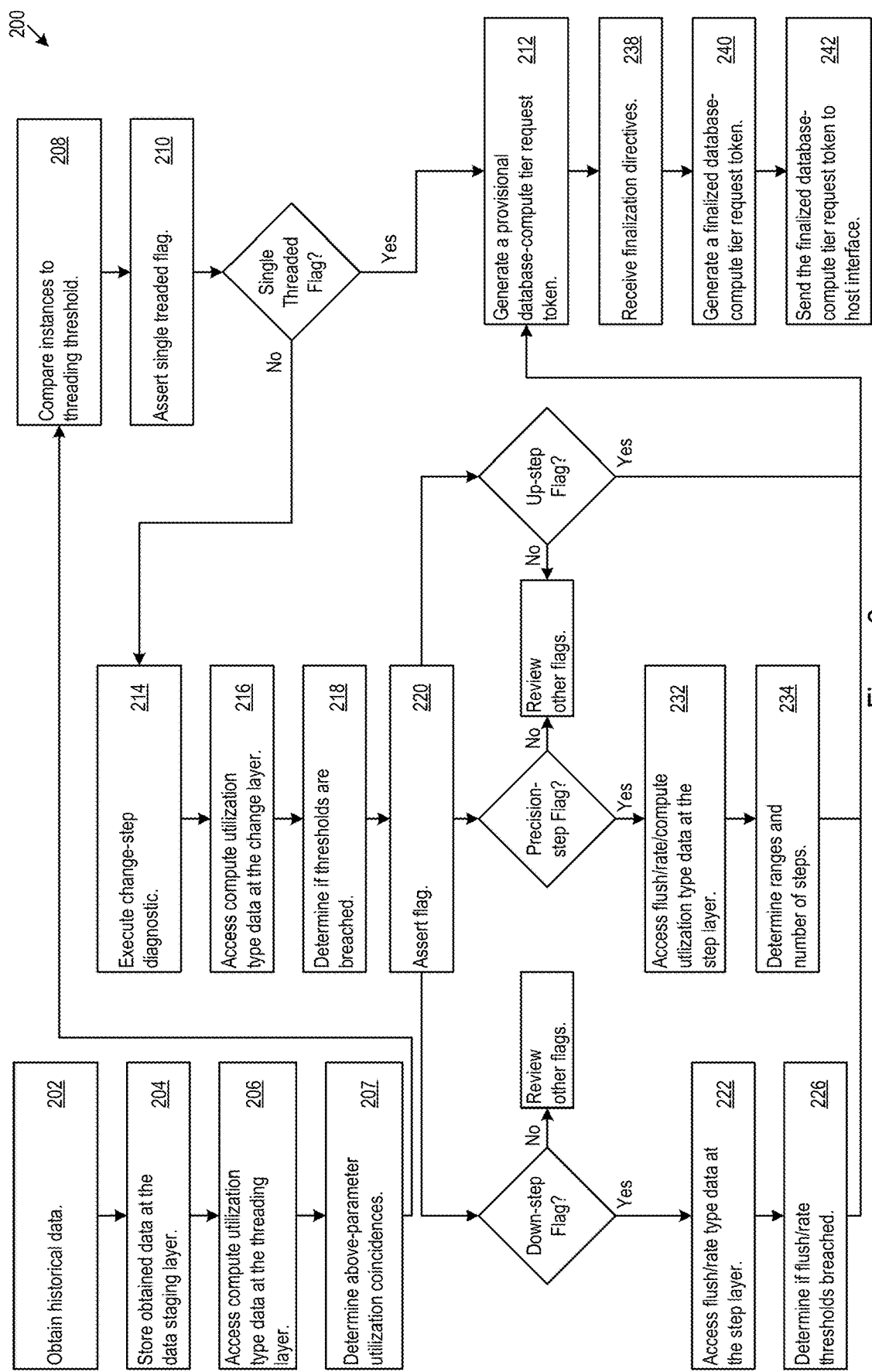
FIG. 2 shows example database sizing stack logic.

In the following, reference is made to FIG. 1 and the corresponding example database sizing stack logic (DSSL) 200 in FIG. 2. The logical features of DSSL 200 may be implemented in various orders and combinations. For example, in a first implementation, one or more features may be omitted or reordered with respect to a second implementation. At the input layer 110 of the database sizing stack 100, the DSSL 200 may obtain historical data 112 (202) and then store the historical data 112 at the data-staging layer 105 (204). In some cases, historical data 112 may be received via communication interfaces (e.g., communication interfaces 312, discussed below). The historical data 112 may be accessed at least in part, e.g., via the communication interfaces 312, from data sources 111, which may include, database-compute utilization history databases, cloud expenditure databases, master virtual machine cost databases, use-history databases, storage access logs, virtual machine family/template description data, or other data sources. The historical data 112 may be provided by database-compute history databases, cloud expenditure databases, committed-use history databases, or other utilization data sources. The further data for the analysis may be provided by client preferences, service logs, description data, queries, or other database-compute data sources. Consumption metric data, as discussed below, may be obtained from cloud expenditure databases, master database-compute cost databases, expenditure histories, or other consumption metric data sources.

After the historical data, including various data types, such as compute utilization type data detailing processor and/or RAM usage over time, operation rate date detail rates and time-transaction-densities of database-compute operations/transactions, flush data detailing flushes of logs or other flushes, and/or other data, is obtained and stored the DSSL 200, at a threading layer 120 of the database sizing stack may access the compute utilization type data (206) to determine above-parameter utilization coincidences for multiple cores, the above-parameter utilization coincidences including instances of multiple ones of the multiple cores having simultaneous above-parameter utilization (207). Above-parameter utilization may be a utilization level for a core that exceeds/meets a pre-determined parameter level. In an example, the parameter level may be 100% (e.g., above-parameter utilization occurs when a core registers 100% utilization and/or no available capacity). Simultaneous above-parameter utilization may occur when two or more cores report above-parameter utilization at the same time.

The DSSL 200 may compare the determined number/density instances of simultaneous above-parameter utilization to a threading threshold (208). When the above-parameter utilization coincidences exceed a threading threshold, the DSSL 200 may determine that execution of a single-threaded task occurred. This determination runs counter to conventional wisdom because the cores are reporting simultaneous utilization which also is a characteristic of multi-threaded application execution. However, the determination based on anomalous above-parameter simultaneous utilization allows for differentiation between single-threading and multi-threading. The DSSL 200 may assert a single-threaded flag 442 when execution of a single-threaded task occurred is determined to have occurred (210).

When the single-threaded flag 442 is asserted, the DSSL 200 may skip a change-step diagnostic, and generate a provisional tier requisition token 144 with a request for database-compute resources at a current database-compute tier (212). In some implementations, the DSSL 200 may generate an error (e.g., for presentation on a DC-command interface 172 generated by the presentation layer 170) indicating that signal threaded application execution was detected.

Table 1 shows example pseudocode for determination of single threaded application execution.

TABLE 1

Example Single Threaded Determination

Single-Threaded Application Flag ($\alpha$) = If (($\beta$>=y) & ($\delta$<=((1/$\epsilon$) + 0.1* (1/$\epsilon$)))) then "YES" else "NO" -> Equation 1a
Where,
$\beta$ = % of 100% CPU values in the given utilization array
y = Peak utilization threshold
$\delta$ = $95^{th}$ CPU percentile value
$\epsilon$ = No of vCores The DSSL 200 may proceed to execute the change-step diagnostic at the change layer 130 of the database sizing stack (214). The change-step diagnostic may determine whether a change in the current database compute tier should be implemented. The change-step diagnostic may be skipped when single-threaded application execution occurs because the utilization data created as a result of this execution may be anomalous and may indicate utilization that is higher than warranted for computations that did occur.

The change-step diagnostic may include accessing the compute utilization type data via a memory resource provided by a data-staging layer of the database sizing stack (216).

In various implementations, when analyzing the compute utilization data the DSSL 200 may apply weights to different portions of the data. For example, for RAM utilization data, the DSSL 200 may weight more recent data more heavily than older data. For example, for dataset with 90 days of data, the DSSL 200 may weigh the most recent 30 day more heavily than that least recent 30 days. In various implementations, the weights may be applied at various ones of the analyses at the threading, change, and/or step layers.

The change-step diagnostic may further include multiple threshold comparisons to determine whether the current database compute tier should be evaluated (e.g., at the step layer 135) for a down-step (a step downward by a single tier), a multi-step (a precise downward step of one or more tiers), or an up-step (a step upward by a single tier). The DSSL may determine whether the determining whether compute utilization is below a down-step threshold, below multi-step threshold, and/or above an up-step threshold (218). Depending on which threshold is breached, the DSSL 200 may correspondingly assert a down-step flag, a precision-step flag, or an up-step flag (220). In various implementations, the availability of flags may vary. For example some implementations may exclude one or more of the down-step, precision-step, and/or up-step flag types. In some cases, the precision-step flag may supplant the down-step flag (e.g., where single thresholds for each flag are used). However, in some implementations non-overlapping ranges for the down-step and precision-step flags may be used. For example, the range for the down-step flag may end where compute utilization is low enough to support evaluation for multiple downward steps. Table 2 shows example pseudo-code for flag assignment at an example change layer 130.

TABLE 2

Example Flag Assignment

Down-step flag ($\zeta$cpu) = If ($\alpha$ = "NO" If Else (($\eta_{CPU}$<=0.4) OR [(($\epsilon$/l) * $\theta$>0.9) & {($\eta_{CPU}$>0.4) & ($\delta$<=0.1)}] then "YES" else "NO")) -> Equation 1c
Precise-step flag ($K_{CPU}$) = If ($\alpha$ ="No" If Else (($\epsilon$/l) * $\theta$<0.9 then "YES" else "NO")) -> Equation 1d
Up-step flag ($\lambda_{CPU}$) = If ($\alpha$ ="No" If Else ($\delta$ >=0.9,"Yes","No")) -> Equation 1e
Where,
$\alpha$ = Single-threaded application flag
$\beta$ = % of 100% CPU values in the historical utilization array
$\gamma$ = Peak utilization threshold
$\delta$ = 95$^{th}$ CPU percentile value
$\epsilon$ = No of vCores
$\zeta_{CPU}$ = Down-step flag
$K_{CPU}$ = Precise-step flag
$\lambda_{CPU}$ = Up-step flag
$\eta_{CPU}$ = Maximum CPU utilization in the historical utilization array
$\theta$ = 99$^{th}$ CPU percentile value
l = Two-step downsize vCore At the step layer 135, the DSSL 200 may determine whether to adjust the tier by the the steps indicated by asserted flags. When an up-step flag is asserted, the DSSL 200 may generate the provisional tier requisition token with a request for database-compute resources at a down-step database-compute tier (212). In some implementations, the DSSL 200 may proceed to this prescription without additional analysis at the step layer 135 because, the DSSL 200 may aim to maintain performance in individual database activity types rather than having some underprovisioned activity types (e.g., even if the result is that some (or most) activity types are overprovisioned).

When the down-step flag is asserted, the DSSL 200 may access operation rate type data and flush volume type data (222). The DSSL 200 may determine operation rate is below the down-step threshold and log flush volume is below the down-step threshold (226). When both are below their corresponding portions of the down-step threshold, the DSSL 200 may generate the provisional tier requisition token with a request for database-compute resources at a down-step database-compute tier (212). If either are above threshold, the DSSL 200 may generate the provisional tier requisition token with a request for database-compute resources at the current database-compute tier to indicate that no change is prescribed (212).

When the precision-step flag is asserted, the DSSL 200 may access compute utilization type data, operation rate type data, and flush volume type data (232). In various implementations, the access may be based on a memory resource provided by the data staging layer 105. The DSSL 200 may determine ranges for activity levels for the different database activity types (234). The ranges may correspond to a number of steps (e.g., tiers) downward from a current database tier that would still support the measured/predicted activity level for the given activity type. For a given activity type, the DSSL 200 may have multiple defined ranges corresponding to different numbers of steps. For example, the DSSL 200 may determine a compute-utilization-range and corresponding compute-step, an operation-rate-range and corresponding rate-step, and/or a flush-volume-range and corresponding flush-step. The DSSL 200 may determine the tier reduction to apply by selecting the precise downward step that supports the individual activity levels (e.g., leaves none unsupported). For example, the DSSL 200 may implement the smallest step from among the compute-step, the rate-step, and the flush-step. Table 3 shows example pseudo-code for determination of steps and flags for various activity types.

TABLE 3

Example Step and Flag Determinations

One-step downsize vCores ($\mu$) = If ($\zeta_{CPU}$ = "YES" then v else 0)) -> Equation 1f
One-step upsize vCores ($\xi$) = If ($\lambda_{CPU}$ = "YES" then $\Pi$ else 0)) -> Equation 1g
Precise downsize vCores ($\rho$) = If ($K_{CPU}$ = "Yes" then $\epsilon$/($\zeta$/$\theta$) else 0) ->Equation 1h
Where,
v = Number of vCores corresponding to one-step lower size
$\Pi$ = Number of vCores corresponding to one-step higher size
$\zeta_{CPU}$ = One-step downsize flag
$K_{CPU}$ = Precise downsize flag
$\lambda_{CPU}$ = One-step upsize flag
$\zeta$ = Simulated selected percentile value for the set of downsized vCore tiers which is closest to target utilization threshold (but less than target).
--------
Final vCore Recommendation ($\sigma$) = Minimum ($\mu$, $\xi$, $\rho$) > 0 -> Equation 1i
Final vCore Recommendation Tier ($T_{CPU}$) = vCore Tier that corresponds to the TABLE 3-continued Example Step and Flag Determinations number of vCore obtained in Equation 1i
--------
Weighted Selected Percentile Memory Utilization Value ($U_{weighted}$) =
($U_{recent}$*Weight_recent) +($U_{interim}$*Weight_interim) +($U_{old}$*Weight_old)
-> Equation 2a
Where,
$U_{recent}$ = Selected percentile Memory utilization value for the most recent period
$U_{interim}$ = Selected percentile Memory utilization value for example interim
$U_{old}$ = Selected percentile Memory utilization value for least recent period
--------
One-step downsize flag ($\zeta_{RAM}$) = If (($\eta_{RAM}$<=0.4) OR [(($\varepsilon_{RAM}/I_{RAM}$) *$U_{weighted}$>0.8) &
{($\eta_{RAM}$>0.4) & ($U_{weighted}$+<=0.1)}] then "YES" else "NO") -> Equation 2b
Precise downsize flag ($K_{RAM}$) = If (($\varepsilon_{RAM}/I_{RAM}$) *$U_{weighted}$<0.8 then "YES" else
"NO") -> Equation 2c
One-step Upsize flag ($\lambda_{RAM}$) = If ($U_{weighted}$>=0.8,"Yes","No") -> Equation 2d
Where,
$U_{weighted}$ = Weighted 99th Memory Utilization Value
$\varepsilon_{RAM}$ = Current Memory
$\zeta_{RAM}$ = One-step downsize flag
$K_{RAM}$ = Precise downsize flag
$\lambda_{RAM}$ = One-step upsize flag
$\eta_{RAM}$ = Maximum memory utilization in the historical utilization array
$I_{RAM}$ = Two-step downsize RAM
--------
One-step downsize RAM ($\mu_{RAM}$) = If ($\zeta_{RAM}$ = "YES" then $V_{RAM}$ else 0)) -> Equation 2e
One-step upsize RAM ($\xi_{RAM}$) = If ($\lambda_{RAM}$ = "YES" then $\Pi_{RAM}$ else 0)) -> Equation 2f
Precise downsize RAM ($\rho_{RAM}$) = If ($K_{RAM}$ = "YES" then $\varepsilon_{RAM}/(\varsigma_{RAM}/U_{weighted})$ else 0)
->
Equation 2g
Where,
$V_{RAM}$ = Number of vCores corresponding to one-step lower size
$\Pi_{RAM}$ = Number of vCores corresponding to one-step higher size
$U_{weighted}$ = Weighted 99th Memory Utilization Value
$\zeta_{RAM}$ = One-step downsize flag
$K_{RAM}$ = Precise downsize flag
$\lambda_{RAM}$ = One-step upsize flag
$\varepsilon_{RAM}$ = Current Memory
$\varsigma_{RAM}$ = Simulated Selected percentile Memory value for the set of downsized vCore
tiers which is closest to target utilization percentage (but less than target).
--------
Final RAM Recommendation ($\sigma_{RAM}$) = MIN (μRAM, ξRAM, ρRAM) > 0 -> Equation
2h
Final vCore Recommendation Tier ($T_{RAM}$) = RAM Tier that corresponds to the
number of RAM obtained in Equation 2h
--------
Recommended Volume ($\varphi_{volume}$) = If ($X_{volume}$>$\Psi_{volume}$ then ($\omega_{volume}$+($\omega_{volume}$*$\Psi$))) else
$\Sigma_{volume}$) -> Equation 3a
Where,
$\varphi_{volume}$ = Recommended Volume Size
$X_{volume}$ = Provisioned Volume/Used Volume ($\Sigma_{volume}/\omega_{volume}$ Ratio)
$\Psi_{volume}$ = Threshold Value for $X_{volume}$
$\omega_{volume}$ = Used Volume
$\Sigma_{volume}$ = Provisioned Volume
$\Psi$ = Buffer (selected buffer level)
Final Recommendation Tier ($T_{volume}$) = The Tier that corresponds to the Volume value
obtained in Equation 3a
--------
Recommended Value (($\varphi_{Vcore\_perf\_bundle}$) = If ($X_{Vcore\_perf\_bundle}$<$\Psi_{Vcore\_perf\_bundle}$ If Else
(($\omega_{Vcore\_perf\_bundle}$+($\omega_{Vcore\_perf\_bundle}$*$\Psi$))<$\Sigma_{Vcore\_perf\_bundle}$ then
($\omega_{Vcore\_perf\_bundle}$+($\omega_{Vcore\_perf\_bundle}$*$\Psi$)) else $\Sigma_{Vcore\_perf\_bundle}$) If Else
(($\Phi_{Vcore\_perf\_bundle}$+($\Phi_{Vcore\_perf\_bundle}$*$\Psi$))<$\omega_{Vcore\_perf\_bundle}$ then
($\Phi_{Vcore\_perf\_bundle}$+($\Phi_{Vcore\_perf\_bundle}$*$\Psi$)) else $\omega_{Vcore\_perf\_bundle}$)) -> Equation 4a
Where,
$\varphi_{Vcore\_perf\_bundle}$ = Recommended IOPS, OLTP, Concurrent Requests & TempDB
$X_{Vcore\_perf\_bundle}$ = Maximum Utilization Value/$99^{th}$ Percentile Value
($\omega_{Vcore\_perf\_bundle}/\Phi_{Vcore\_perf\_bundle}$ Ratio)
$\Psi_{Vcore\_perf\_bundle}$ = Threshold Value for $X_{Vcore\_perf\_bundle}$
$\omega_{Vcore\_perf\_bundle}$ = Maximum Utilization Value
$\Sigma_{Vcore\_perf\_bundle}$ = Provisioned Value
$\Phi_{Vcore\_perf\_bundle}$ = $99^{th}$ Percentile Value
$\Psi$ = Buffer (selected buffer level)
Final Recommendation Tier ($T_{Vcore\_perf\_bundle}$) = The Tier that corresponds to the value
obtained in Equation 4a
--------
FINAL RECOMMENDATION TIER ($T_{Final}$) = Maximum ($T_{CPU}$, $T_{RAM}$, $T_{LogSize}$, $T_{volume}$,
$T_{Vcore\_perf\_bundle}$) -> Equation 6

Once a precision-step is determined, the DSSL 200 may generate a provisional tier requisition token with a request for database-compute resources at the precision-step database-compute tier (212).

At the requisition layer 140, the DSSL 200 may receive (and/or determine) one or more finalization directives 143 (238). The finalization directive 143 may, for example, include commands received from an operator via a database-compute (DC)-command interface 172 generated at the presentation layer 170. The commands may change and/or confirm the selection of the provisional database-compute tier. The provisional database-compute tier may refer to the tier requested in the provisional tier requisition token as a result of the analysis at the threading 120, change 130, and/or step 140 layers. The finalization directive may, for example, include feedback-based machine-learning-trained (e.g., using various machine-learning schemes, deep-learning, neural networks, and/or other machine-learning schemes) adjustments to the adjusted database-compute tier. The feedback (on which to base the machine-learning training) may include operator commands, for example, those received at the DC-command interface 172.

Based on the finalization directive 143, DSSL 200 may generate a finalized tier request token 146 (240). The finalized tier request token 146 may, in some cases, designate a request for resources at the provisional database-compute tier (e.g., when the finalization directive confirms the request for resources at the provisional database-compute tier). In some cases where the finalization directive indicates a change relative to the provisional database-compute tier, the finalized tier request token 144 may designate a request for resources at a finalized database-compute tier that reflects the changes requested relative to the provisional database-compute tier.

After generating the finalized tier request token 146, the DSSL 200 may send the finalized tier request token (242) to a host interface that controls reservation and/or requisition of data-compute resources to execute the request for resources reflected in the finalized tier request token 146.

In some implementations, DSSL 200, at the consumption savings layer 150, may obtain consumption metric data to determine a consumption rate/level for the current and/or provisional database-compute tiers. The DSSL 200 may compare consumption at the current and the provisional database-compute tiers to determine a consumption change factor and/or the current and the provisional database-compute tiers to determine a consumption change factor. The consumption change factor may provide an indication of the change in consumption (e.g., a savings, a cost, or other change in consumption) from the current database-compute tier to the provisional database compute tier. Table 4 shows and example pseudocode for determination of consumption savings.

TABLE 4

Example Consumption Savings Calculation

Savings(S) = (Current Tier Cost − Recommended Tier Cost) + (Current Provisioned Volume Cost − Recommended Volume Cost) -> Equation 7

Table 5 shows example pseudocode which may be used as a specific illustrative and non-limiting example implementation of the DSSL 200.

TABLE 5

Example DSSL Pseudocode

Step0: Load Master Consumption File
    Step0a: Intelligent Consumption File Generation
Step1: Load the input files
Step2: Cleanse the data by formatting and renaming
Step3: Computing the maximum utilization
Step4: Filtering collections data for vCore db tiers
Step5: Merge Utilization, Collections, Consumption and Feature DB
    Step6: Calculating the $n^{th}$ percentile utilization values CPU, RAM, Read/Write IOPS, OLTP, Concurrent Requests and TempDB for each resource id (1,n)
Step7: Computing the recommendation Tier for CPU − Equation 1
    Step7a: Establish if the application is single-threaded or not -> Equation 1a (α)
    Step7b: If vCore Tier is 1-core, establish if it needs to be moved to 2-cores -> Equation 1b (α')
    Step7c: Compute the 3 recommendation flags: $\zeta_{CPU}$, $K_{CPU}$, $\lambda_{CPU}$ -> Equation 1c-1e
    Step7d: Compute the number of vCores μ, ξ, ρ for each of the flags mentioned in 6c -> Equation 1f-1h
    Step7e: Compute Final vCore recommendation (σ) -> Equation 1i
    Step7f: Final vCore Tier (Index Value) $T_{CPU}$
Step8: Computing the recommendation Tier for Memory − Equation 2
    Step8a: Compute the weighted RAM P99 Utilization value ($U_{weighted}$) -> Equation 2a
    Step8b: Compute the 3 recommendation flags: $\zeta_{RAM}$, $K_{RAM}$, $\lambda_{RAM}$ -> Equation 2b-2d
    Step8c: Compute the size of RAM $\mu_{RAM}$, $\xi_{RAM}$, $\rho_{RAM}$ for each of the flags mentioned in 8b -> Equation 2e-2g
    Step8d: Compute Final RAM recommendation ($\sigma_{RAM}$) -> Equation 2h
    Step8e: Final RAM Tier (Index Value) $T_{RAM}$
Step9: Computing the recommendation Tier for Volume − Equation 3
    Step9a: Compute recommended volume size ($\varphi_{volume}$) -> Equation 3a
    Step9b: Recommended Volume Tier (Index Value) $T_{volume}$
Step10: Computing the (GENERIC) recommendation Tier for IOPS, OLTP Storage, Concurrent Requests (Worker) & TempDB − Equation 4
    Step10a: Compute Final recommendation value ($\varphi_{Vcore\_perf\_bundle}$) ->

TABLE 5-continued

Example DSSL Pseudocode

Equation 4a
    Step10b: Final generic Tier (Index Value) $T_{Vcore\_perf\_bundle}$
Step10: Compute the recommendation tier for Log Size ($T_{LogSize}$) – Equation 5
Step12: Compute the final recommendation tier – Equation 6 (Maximum value of Equation 1-5)
Step13: Compute Savings – Equation 7
Step14: Remove the duplicate records and generate the recommendations for each resource id
Step15: Binning the resource ids based on "cumulative potential savings"
    Step15a:
        Bin = 'High' if savings <= low threshold, 'Medium' if low threshold <= savings<= high threshold, 'Low' if high threshold <= savings
Step16: Generate the final output
"Collections" may refer to records of requests that consumption resources be provided to cover usage.

Figure 3:
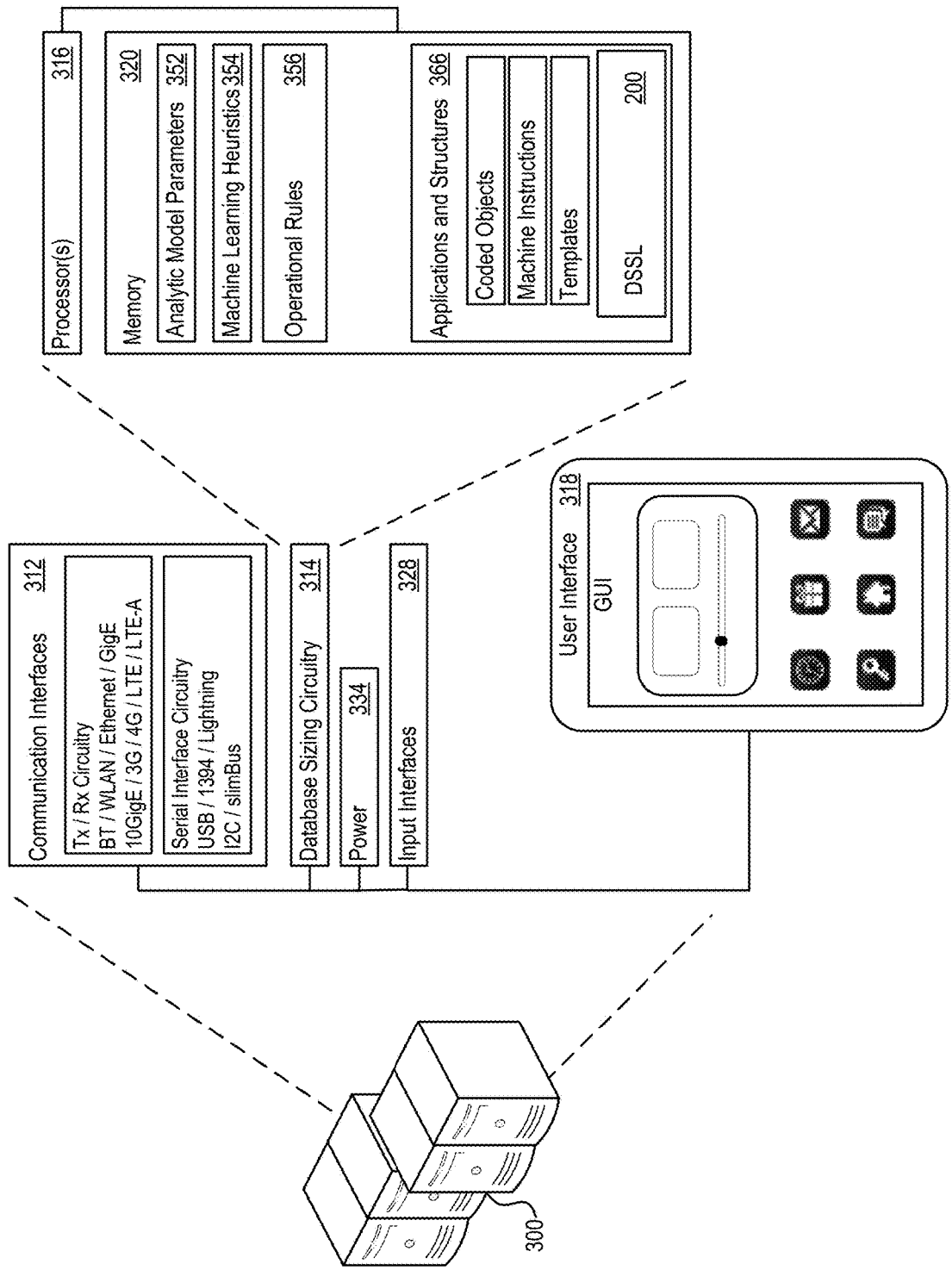
FIG. 3 shows an example specific execution environment for the database sizing stack of FIG. 1.

FIG. 3 shows an example specific execution environment 300 for the database sizing stack 100 described above. The execution environment 300 may include database sizing circuitry 314 to support execution of the multiple layers of database sizing stack 100 described above. The database sizing circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support historical data analysis, tolerance accommodation, strata selection or other tasks described above. The applications and structures may implement the DSSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used to support and/or implement remote operation of the DC-command interface 172. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the DC-command interface 172. In various implementations, the database sizing circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the database sizing stack 100, of the execution environment onto the hardware resources. In some cases, a manifest may be stored as a preference file such as a YAML (yet another mark-up language), JSON, or other preference file type.

Figure 4:
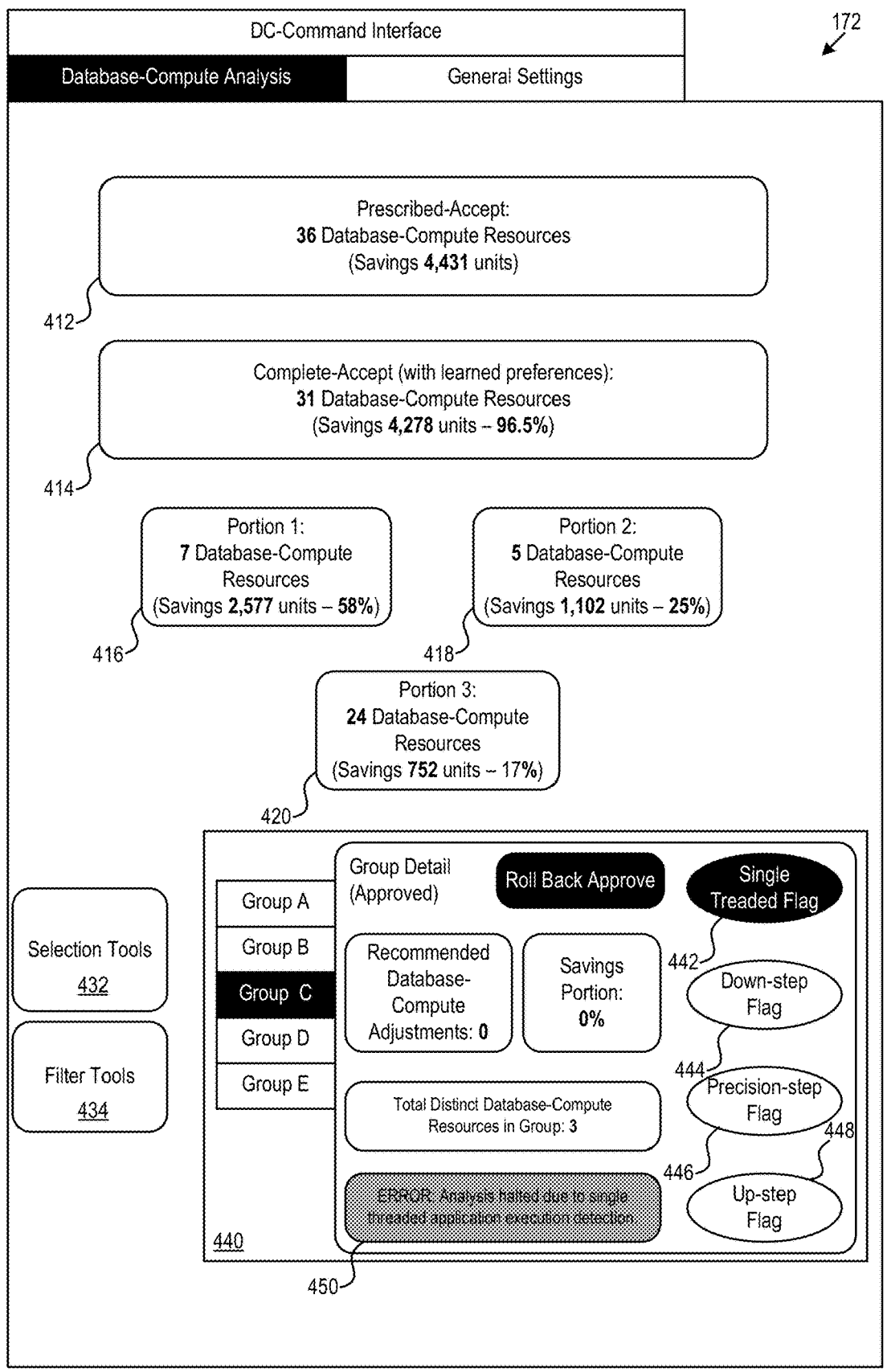
FIG. 4 shows an example database compute (DC)-command interface.

Referring now to FIG. 4, an example DC-command interface 172 is shown. The DC-command interface 172 may include multiple selectable options 412, 414, 416, 418, 420, 422 and data regarding the provisional database-compute tier and/or class placement prescriptions adjustments before and after alteration to accommodate the learned preferences of the operator. In this example scenario, the selectable options may include a prescribed-accept option 412 to implement some or all of the prescribed adjusted database-compute tiers (e.g., for multiple parallel analyses) as a group without alteration based on learned preferences, a complete-accept option 414 to implement the adjusted database-compute tiers with alterations (finalization directives) based on learned preferences, and options 416, 418, 420 to implement adjustments to selected subsets of the computing resources.

Additionally or alternatively, the DC-command interface 172 may include selection and filter tools 432, 434 to support granular manipulation of the tier requisition adjustments, e.g., by resource region, by tolerances accommodated; or other granular manipulation. The indicators 442, 444, 446, and 448 may indicate assertions of various flags asserted during analysis for the groups.

In some implementations, the DC-command interface 172 may include a group detail panel 440 for management of group-level selectable options such as group level approvals of database-compute tiers. Additionally or alternatively, the group detail panel 440 may display group-level information regarding database-compute tier selection. The group detail panel 440 may also provide an option to roll back previously approved database-compute tiers. The group detail panel 440 may indicate errors 450 due to single threaded application detection.

In the example, shown in FIG. 4, the options 416, 418, 420 allow for manipulation of selected subsets of the database-compute resources. For example, as shown the example routine in table two, the tier requisition adjustments may be "binned" into consumption savings classes. For example, "high", "medium", and "low" consumption savings bins may allow the operator to select specific groups of tier requisition adjustments (e.g., as determined as the consumption savings layer 150). The options 416, 418, 420 show the respective portions of the total consumption savings that may be achieved by adjusting each specific subset of the database-compute tiers. In the example, the first subset option 416 provides the greatest marginal consumption savings, while the options 418, 420 provide successively smaller marginal consumption savings.

Figure 5:
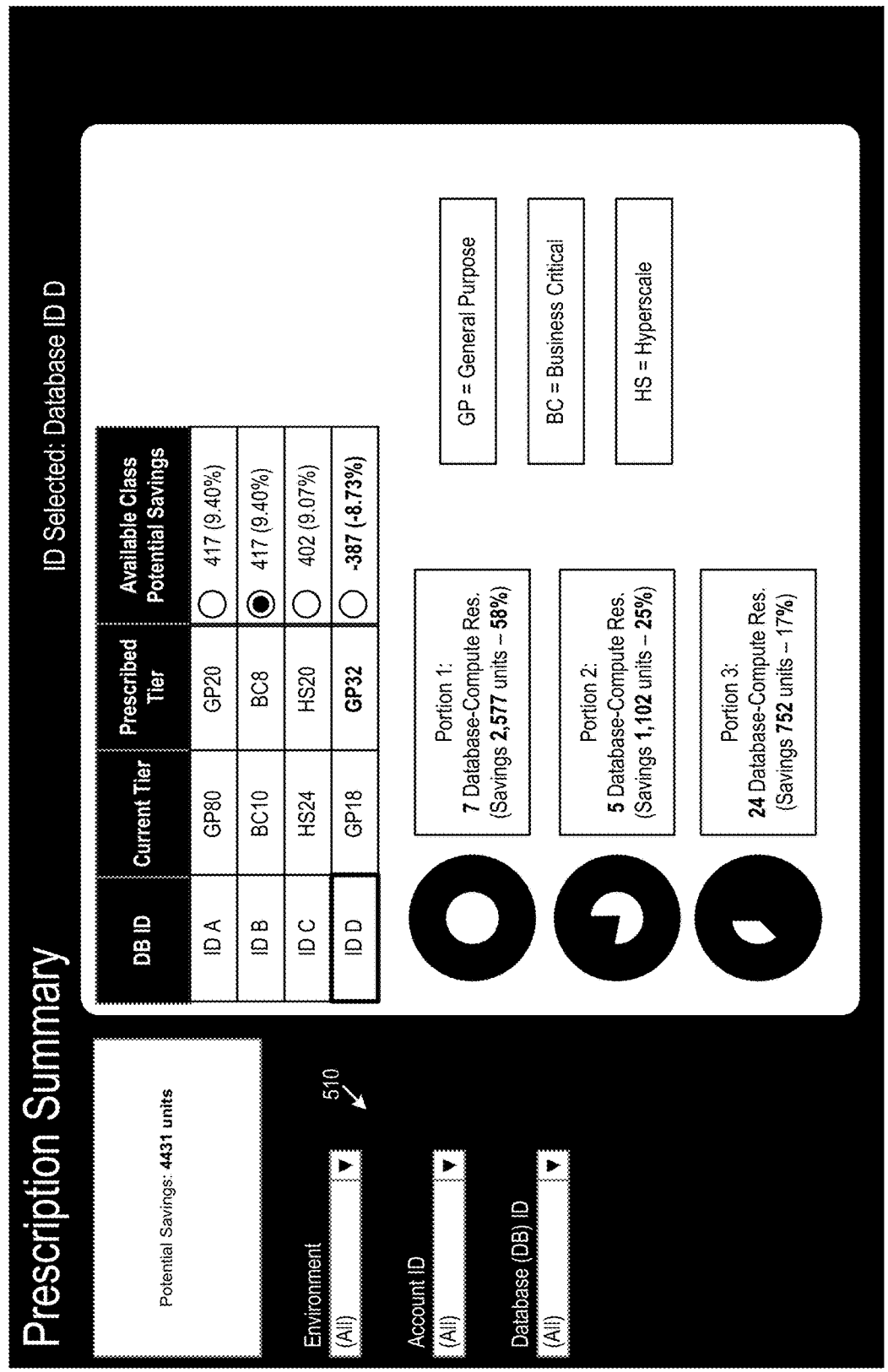
FIG. 5 shows a second example DC-command interface.

FIG. 5 shows a second example DC-command interface 500. The second example DC-command interface 500 is database identifier (e.g., a specific and/or unique designation for a given database-compute resource) specific. The DC-command interface 500 provides detail panels 504 with regard to consumption savings for the selected database-compute resource (DB ID). Selections based on operator preferences may be made within the detail panels 504. The DC-command interface 500 may further include tools 510 for filtering and selecting database identifiers for detail display within the example DC-command interface 500.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above. Table 6 shows various examples.

E1 In an example, a system includes: database sizing circuitry configured to execute a database sizing stack, the database sizing circuitry configured to: at a data-staging layer of the database sizing stack: obtain historical data including data types, the data types including compute utilization type data, operation rate type data, and flush volume type data; and at a threading layer of the database sizing stack; based on the compute utilization type data, determine above-parameter utilization coincidences for multiple cores, the above-parameter utilization coincidences including instances of multiple ones of the multiple cores having simultaneous above-parameter utilization; when the above-parameter utilization coincidences exceed a threading threshold, determine that execution of a single-threaded task occurred despite simultaneous utilization of multiple cores; and when execution of a single-threaded task occurred is determined to have occurred, assert a single-threaded flag; when the single-threaded flag is asserted: skip a change-step diagnostic; and generate a provisional tier requisition token with a request for database-compute resources at a current database-compute tier; at a change layer of the database sizing stack: when the single-threaded flag is not asserted execute the change-step diagnostic by: accessing the compute utilization type data via a memory resource provided by a data-staging layer of the database sizing stack; and based on the compute utilization type data: determining whether compute utilization is below a down-step threshold; determining whether the compute utilization is below multi-step threshold; when compute utilization is below the down-step threshold, asserting a down-step flag; and when compute utilization is below the multi-step threshold, asserting a precision-step flag over the down-step flag, the multi-step threshold below the down-step threshold; at a step layer of the database sizing stack: when the down-step flag is asserted: access operation rate type data and flush volume type data via a memory resource provided by a data-staging layer of the database sizing stack; and based on the operation rate type data and flush volume type data: determine whether an operation rate is below the down-step threshold; determine whether log flush volume is below the down-step threshold; when both the operation rate and the log flush volume are below the down-step threshold, generate the provisional tier requisition token with a request for database-compute resources at a down-step database-compute tier; and when at least the operation rate or the log flush volume is above the down-step threshold, generate the provisional tier requisition token with a request for database-compute resources at the current database-compute tier; when the precision-step flag is asserted: access compute utilization type data, operation rate type data, and flush volume type data via a memory resource provided by a data-staging layer of the database sizing stack; and based on the compute utilization type data, operation rate type data, and flush volume type data: determine a compute-utilization-range and corresponding compute-step; determine a operation-rate-range and corresponding rate-step; determine a flush-volume-range and corresponding flush-step; determine a precision-step database-compute tier based on a smallest among the compute-step, the rate-step, and the flush-step; and generate the provisional tier requisition token with a request for database-compute resources at the precision-step database-compute tier; at a requisition layer of the database sizing stack after generating the provisional tier requisition token and based on a finalization directive, generate a finalized tier requisition token; and network interface circuitry configured to send the finalized tier requisition token to a host interface for control of database-compute resources.

E2 The system of example E1 or any other example in this group, where the database sizing circuitry is further configured to: at the change layer: determine whether the compute utilization is above an up-step threshold; and when the compute utilization is above the up-step threshold, assert an up-step flag.

E3 The system of example E2 or any other example in this group, where the database sizing circuitry is further configured to, at the change layer and when the up-step flag is asserted, generate the provisional tier requisition token with a request for database-compute resources at an up-step database-compute tier.

E4 The system of example E1 or any other example in this group, where the finalization directive includes: an operator input command received at a database-compute command-interface generated at a presentation layer of the database sizing stack; a feedback-trained machine learning adjustment determined based on an operator input command history; or both.

E5 The system of example E1 or any other example in this group, where the database sizing circuitry is configured to, at a consumption savings layer of the database sizing stack: obtain consumption metric data for the current database-compute tier and a provisional database-compute tier requested in the provisional tier requisition token, the current database-compute tier associated with operation during capture of at least a portion of the historical data; determine a current consumption level using the consumption metric data for the current database-compute tier; determine an provisional consumption level using the consumption metric data for the provisional database-compute tier; and compare the current consumption level to the provisional consumption level to determine a consumption change factor.

E6 The system of example E1 or any other example in this group, where the database sizing circuitry is configured to determine a core-utilization-range by determining that utilization for the multiple cores falls within one of multiple pre-defined ranges.

E7 The system of example E1 or any other example in this group, where the database sizing circuitry is configured to determine whether compute utilization is below a down-step threshold by determining random access memory (RAM) utilization.

E8 The system of example E7 or any other example in this group, where the database sizing circuitry is configured to determine random access memory (RAM) utilization by applying weights to the compute utilization type data.

E9 The system of example E8 or any other example in this group, where the database sizing circuitry is configured to apply weights to the compute utilization type data by applying more weight to more recent data than to less recent data.

E10 The system of example E9 or any other example in this group, where: the compute utilization type data includes data over a 90-day period; and the database sizing circuitry is configured to apply weights to the compute utilization type data by applying more weight to a most recent 30-day portion of the compute utilization data than to a least recent 30-day portion of the compute utilization data.

E11 The system of example E1 or any other example in this group, where the host interface for control of database-compute resources includes a host interface for requisition of Azure vCore database resources.

E12 In an example, a method includes: at database sizing circuitry executing a database sizing stack: at a data-staging layer of the database sizing stack: obtaining historical data including data types, the data types including compute utilization type data, operation rate type data, and flush volume type data; and at a threading layer of the database sizing stack; based on the compute utilization type data, determining above-parameter utilization coincidences for multiple cores, the above-parameter utilization coincidences including instances of multiple ones of the multiple cores having simultaneous above-parameter utilization; when the above-parameter utilization coincidences exceed a threading threshold, determining that execution of a single-threaded task occurred despite simultaneous utilization of multiple cores; and when execution of a single-threaded task occurred is determined to have occurred, asserting a single-threaded flag; when the single-threaded flag is asserted: skipping a change-step diagnostic; and generating a provisional tier requisition token with a request for database-compute resources at a current database-compute tier; at a change layer of the database sizing stack: when the single-threaded flag is not asserted executing the change-step diagnostic by: accessing the compute utilization type data via a memory resource provided by a data-staging layer of the database sizing stack; and based on the compute utilization type data: determining whether compute utilization is below a down-step threshold; determining whether the compute utilization is below multi-step threshold; when compute utilization is below the down-step threshold, asserting a down-step flag; and when compute utilization is below the multi-step threshold, asserting a precision-step flag over the down-step flag, the multi-step threshold below the down-step threshold; at a step layer of the database sizing stack: when the down-step flag is asserted: accessing operation rate type data and flush volume type data via a memory resource provided by a data-staging layer of the database sizing stack; and based on the operation rate type data and flush volume type data: determining whether an operation rate is below the down-step threshold; determining whether log flush volume is below the down-step threshold; when both the operation rate and the log flush volume are below the down-step threshold, generating the provisional tier requisition token with a request for database-compute resources at a down-step database-compute tier; and when at least the operation rate or the log flush volume is above the down-step threshold, generating the provisional tier requisition token with a request for database-compute resources at the current database-compute tier; when the precision-step flag is asserted: accessing compute utilization type data, operation rate type data, and flush volume type data via a memory resource provided by a data-staging layer of the database sizing stack; and based on the compute utilization type data, operation rate type data, and flush volume type data: determining a compute-utilization-range and corresponding compute-step; determining an operation-rate-range and corresponding rate-step; determining a flush-volume-range and corresponding flush-step; determining a precision-step database-compute tier based on a smallest among the compute-step, rate-step, and flush-step; and generating the provisional tier requisition token with a request for database-compute resources at the precision-step database-compute tier; at a requisition layer of the database sizing stack after generating the provisional tier requisition token and based on a finalization directive, generating a finalized tier requisition token; and at network interface circuitry, sending the finalized tier requisition token to a host interface for control of database-compute resources.

E13 The method of example E12 or any other example in this group, further including: at the change layer: determining whether the compute utilization is above an up-step threshold; and when the compute utilization is above the up-step threshold, asserting an up-step flag.

E14 The method of example E13 or any other example in this group, further including: at the change layer and when the up-step flag is asserted, generating the provisional tier requisition token with a request for database-compute resources at an up-step database-compute tier.

E15 The method of example E12 or any other example in this group, where the finalization directive includes: an operator input command received at a database-compute command-interface generated at a presentation layer of the database sizing stack; a feedback-trained machine learning adjustment determined based on an operator input command history; or both.

E16 The method of example E12 or any other example in this group, further including, at a consumption savings layer of the database sizing stack: obtaining consumption metric data for the current database-compute tier and a provisional database-compute tier requested in the provisional tier requisition token, the current database-compute tier associated with operation during capture of at least a portion of the historical data; determining a current consumption level using the consumption metric data for the current database-compute tier; determining an provisional consumption level using the consumption metric data for the provisional database-compute tier; and comparing the current consumption level to the provisional consumption level to determine a consumption change factor.

E17 The method of example E12 or any other example in this group, where determining a core-utilization-range includes determining that utilization for the multiple cores falls within one of multiple pre-defined ranges.

E18 The method of example E12 or any other example in this group, where determining whether compute utilization is below a down-step threshold includes determining random access memory (RAM) utilization.

E19 In an example, a system includes: database sizing circuitry configured to execute a database sizing stack, the database sizing circuitry configured to: at a data-staging layer of the database sizing stack: obtain compute utilization type data; and at a threading layer of the database sizing stack; based on the compute utilization type data, determine above-parameter utilization coincidences for multiple cores, the above-parameter utilization coincidences including instances of multiple ones of the multiple cores having simultaneous above-parameter utilization; when the above-parameter utilization coincidences exceed a threading threshold, determine that execution of a single-threaded task occurred despite simultaneous utilization of multiple cores; and when execution of a single-threaded task occurred is determined to have occurred, assert a single-threaded flag; when the single-threaded flag is asserted: skip a change-step diagnostic; and generate a provisional tier requisition token with a request for database-compute resources at a current database-compute tier; at a change layer of the database sizing stack: when the single-threaded flag is not asserted execute the change-step diagnostic by: determining whether core utilization is below a down-step threshold; and when the core utilization is below the down-step threshold, asserting a down-step flag; at a step layer of the database sizing stack and when the down-step flag is asserted: determine whether a down-step criterion is met; when the down-step criterion is met, generate the provisional tier requisition token with a request for database-compute resources at a down-step database-compute tier; and when the down-step criterion is not met, generate the provisional tier requisition token with a request for database-compute resources at the current database-compute tier; at a requisition layer of the database sizing stack after generating the provisional tier requisition token and based on a finalization directive, generate a finalized tier requisition token; and network interface circuitry configured to send the finalized tier requisition token to a host interface for control of database-compute resources.

E20 The system of example E19 or any other example in this group, where the database sizing circuitry is configured to generate an error for presentation on a database-compute command-interface, the error indicating that single-threaded application execution was detected in the compute utilization type data.

E21 A method implemented by operation of a system of any of the examples in this group.

E22 A product including instructions stored on a machine readable medium, the instructions configured to cause a machine to implement the method of example E21 or any other example in this group.

Various implementations have been specifically described. However, many other implementations are also possible.

What is claimed is:

1. A system including:
   database sizing circuitry configured to execute a database sizing stack, the database sizing circuitry configured to:
   at a data-staging layer of the database sizing stack:
   obtain historical data including data types, the data types including compute utilization type data, operation rate type data, and flush volume type data; and
   at a threading layer of the database sizing stack;
   based on the compute utilization type data, determine above-parameter utilization coincidences for multiple cores, the above-parameter utilization coincidences including instances of multiple ones of the multiple cores having simultaneous above-parameter utilization;
   when the above-parameter utilization coincidences exceed a threading threshold, determine that execution of a single-threaded task occurred despite simultaneous utilization of multiple cores; and
   when execution of a single-threaded task occurred is determined to have occurred, assert a single-threaded flag;
   when the single-threaded flag is asserted:
   skip a change-step diagnostic; and
   generate a provisional tier requisition token with a request for database-compute resources at a current database-compute tier;
   at a change layer of the database sizing stack:
   when the single-threaded flag is not asserted execute the change-step diagnostic by:
   accessing the compute utilization type data via a memory resource provided by a data-staging layer of the database sizing stack; and
   based on the compute utilization type data:
   determining whether compute utilization is below a down-step threshold;
   determining whether the compute utilization is below multi-step threshold;
   when compute utilization is below the down-step threshold, asserting a down-step flag; and when compute utilization is below the multi-step threshold, asserting a precision-step flag over the down-step flag, the multi-step threshold below the down-step threshold;
at a step layer of the database sizing stack:
when the down-step flag is asserted:
access operation rate type data and flush volume type data via a memory resource provided by a data-staging layer of the database sizing stack; and
based on the operation rate type data and flush volume type data:
determine whether an operation rate is below the down-step threshold;
determine whether log flush volume is below the down-step threshold;
when both the operation rate and the log flush volume are below the down-step threshold, generate the provisional tier requisition token with a request for database-compute resources at a down-step database-compute tier; and
when at least the operation rate or the log flush volume is above the down-step threshold, generate the provisional tier requisition token with a request for database-compute resources at the current database-compute tier;
when the precision-step flag is asserted:
access compute utilization type data, operation rate type data, and flush volume type data via a memory resource provided by a data-staging layer of the database sizing stack; and
based on the compute utilization type data, operation rate type data, and flush volume type data:
determine a compute-utilization-range and corresponding compute-step;
determine an operation-rate-range and corresponding rate-step;
determine a flush-volume-range and corresponding flush-step;
determine a precision-step database-compute tier based on a smallest among the compute-step, the rate-step, and the flush-step; and
generate the provisional tier requisition token with a request for database-compute resources at the precision-step database-compute tier;
at a requisition layer of the database sizing stack after generating the provisional tier requisition token and based on a finalization directive, generate a finalized tier requisition token; and
network interface circuitry configured to send the finalized tier requisition token to a host interface for control of database-compute resources.

2. The system of claim 1, where the database sizing circuitry is further configured to:
at the change layer:
determine whether the compute utilization is above an up-step threshold; and
when the compute utilization is above the up-step threshold, assert an up-step flag.

3. The system of claim 2, where the database sizing circuitry is further configured to, at the change layer and when the up-step flag is asserted, generate the provisional tier requisition token with a request for database-compute resources at an up-step database-compute tier.

4. The system of claim 1, where the finalization directive includes:
an operator input command received at a database-compute command-interface generated at a presentation layer of the database sizing stack;
a feedback-trained machine learning adjustment determined based on an operator input command history; or both.

5. The system of claim 1, where the database sizing circuitry is configured to, at a consumption savings layer of the database sizing stack:
obtain consumption metric data for the current database-compute tier and a provisional database-compute tier requested in the provisional tier requisition token, the current database-compute tier associated with operation during capture of at least a portion of the historical data;
determine a current consumption level using the consumption metric data for the current database-compute tier;
determine an provisional consumption level using the consumption metric data for the provisional database-compute tier; and
compare the current consumption level to the provisional consumption level to determine a consumption change factor.

6. The system of claim 1, where the database sizing circuitry is configured to determine a core-utilization-range by determining that utilization for the multiple cores falls within one of multiple pre-defined ranges.

7. The system of claim 1, where the database sizing circuitry is configured to determine whether compute utilization is below a down-step threshold by determining random access memory (RAM) utilization.

8. The system of claim 7, where the database sizing circuitry is configured to determine random access memory (RAM) utilization by applying weights to the compute utilization type data.

9. The system of claim 8, where the database sizing circuitry is configured to apply weights to the compute utilization type data by applying more weight to more recent data than to less recent data.

10. The system of claim 9, where:
the compute utilization type data includes data over a 90-day period; and
the database sizing circuitry is configured to apply weights to the compute utilization type data by applying more weight to a most recent 30-day portion of the compute utilization data than to a least recent 30-day portion of the compute utilization data.

11. The system of claim 1, where the host interface for control of database-compute resources includes a host interface for requisition of Azure vCore database resources.

12. A method including:
at database sizing circuitry executing a database sizing stack:
at a data-staging layer of the database sizing stack:
obtaining historical data including data types, the data types including compute utilization type data, operation rate type data, and flush volume type data; and
at a threading layer of the database sizing stack;
based on the compute utilization type data, determining above-parameter utilization coincidences for multiple cores, the above-parameter utilization coincidences including instances of multiple ones of the multiple cores having simultaneous above-parameter utilization;

when the above-parameter utilization coincidences exceed a threading threshold, determining that execution of a single-threaded task occurred despite simultaneous utilization of multiple cores; and when execution of a single-threaded task occurred is determined to have occurred, asserting a single-threaded flag;

when the single-threaded flag is asserted:
skipping a change-step diagnostic; and
generating a provisional tier requisition token with a request for database-compute resources at a current database-compute tier;

at a change layer of the database sizing stack:
when the single-threaded flag is not asserted executing the change-step diagnostic by:
accessing the compute utilization type data via a memory resource provided by a data-staging layer of the database sizing stack; and
based on the compute utilization type data:
determining whether compute utilization is below a down-step threshold;
determining whether the compute utilization is below multi-step threshold;
when compute utilization is below the down-step threshold, asserting a down-step flag; and
when compute utilization is below the multi-step threshold, asserting a precision-step flag over the down-step flag, the multi-step threshold below the down-step threshold;

at a step layer of the database sizing stack:
when the down-step flag is asserted:
accessing operation rate type data and flush volume type data via a memory resource provided by a data-staging layer of the database sizing stack; and
based on the operation rate type data and flush volume type data:
determining whether an operation rate is below the down-step threshold;
determining whether log flush volume is below the down-step threshold;
when both the operation rate and the log flush volume are below the down-step threshold, generating the provisional tier requisition token with a request for database-compute resources at a down-step database-compute tier; and
when at least the operation rate or the log flush volume is above the down-step threshold, generating the provisional tier requisition token with a request for database-compute resources at the current database-compute tier;

when the precision-step flag is asserted:
accessing compute utilization type data, operation rate type data, and flush volume type data via a memory resource provided by a data-staging layer of the database sizing stack; and
based on the compute utilization type data, operation rate type data, and flush volume type data:
determining a compute-utilization-range and corresponding compute-step;
determining an operation-rate-range and corresponding rate-step;
determining a flush-volume-range and corresponding flush-step;
determining a precision-step database-compute tier based on a smallest among the compute-step, rate-step, and flush-step; and
generating the provisional tier requisition token with a request for database-compute resources at the precision-step database-compute tier;

at a requisition layer of the database sizing stack after generating the provisional tier requisition token and based on a finalization directive, generating a finalized tier requisition token; and at network interface circuitry, sending the finalized tier requisition token to a host interface for control of database-compute resources.

13. The method of claim 12, further including:
at the change layer:
determining whether the compute utilization is above an up-step threshold; and
when the compute utilization is above the up-step threshold, asserting an up-step flag.

14. The method of claim 13, further including:
at the change layer and when the up-step flag is asserted, generating the provisional tier requisition token with a request for database-compute resources at an up-step database-compute tier.

15. The method of claim 12, where the finalization directive includes:
an operator input command received at a database-compute command-interface generated at a presentation layer of the database sizing stack;
a feedback-trained machine learning adjustment determined based on an operator input command history; or both.

16. The method of claim 12, further including, at a consumption savings layer of the database sizing stack:
obtaining consumption metric data for the current database-compute tier and a provisional database-compute tier requested in the provisional tier requisition token, the current database-compute tier associated with operation during capture of at least a portion of the historical data;
determining a current consumption level using the consumption metric data for the current database-compute tier;
determining an provisional consumption level using the consumption metric data for the provisional database-compute tier; and
comparing the current consumption level to the provisional consumption level to determine a consumption change factor.

17. The method of claim 12, where determining a core-utilization-range includes determining that utilization for the multiple cores falls within one of multiple pre-defined ranges.

18. The method of claim 12, where determining whether compute utilization is below a down-step threshold includes determining random access memory (RAM) utilization.

* * * * *

UNITED STATES PATENT AND TRADEMARK OFFICE
CERTIFICATE OF CORRECTION

PATENT NO. : 11,899,634 B2
APPLICATION NO. : 17/204102
DATED : February 13, 2024
INVENTOR(S) : Madhan Kumar Srinivasan et al.

It is certified that error appears in the above-identified patent and that said Letters Patent is hereby corrected as shown below:

In the Specification

Column 6, in the body of Table 3, in the 2$^{nd}$ and 6$^{th}$ Lines, delete "II" and insert in its place --$\pi$--.

Column 6, in the body of Table 3, in Line 10, delete "ξ" and insert in its place --ς--.

Column 7, in the body of Table 3, in Line 12, delete "(U$_{weighted}$+" and insert in its place --(U$_{weighted}$--.

Column 7, in the body of Table 3, in Lines 26 and 32, delete "II$_{RAM}$" and replace with --$\pi_{RAM}$--.

Column 7, in the body of Table 3, in Line 46, delete ")))" and insert in its place --))--.

Signed and Sealed this
Sixteenth Day of July, 2024

Katherine Kelly Vidal
*Director of the United States Patent and Trademark Office*